(12) United States Patent
van Dijk et al.

(10) Patent No.: US 11,870,603 B2
(45) Date of Patent: Jan. 9, 2024

(54) CONTROLLER AREA NETWORK TERMINATION SCHEME

(71) Applicant: NXP B.V., Eindhoven (NL)

(72) Inventors: Lucas Pieter Lodewijk van Dijk, Kranenburg (DE); Adrien Manfred Schoof, Hamburg (DE)

(73) Assignee: NXP B.V., Eindhoven (NL)

( * ) Notice: Subject to any disclaimer, the term of this patent is extended or adjusted under 35 U.S.C. 154(b) by 93 days.

(21) Appl. No.: 17/567,056

(22) Filed: Dec. 31, 2021

(65) Prior Publication Data

US 2023/0216705 A1 Jul. 6, 2023

(51) Int. Cl.
*H04L 12/40* (2006.01)
*H04L 1/00* (2006.01)

(52) U.S. Cl.
CPC ...... *H04L 12/40013* (2013.01); *H04L 1/0041* (2013.01); *H04L 1/0045* (2013.01); *H04L 12/40026* (2013.01); *H04L 12/40052* (2013.01); *H04L 2012/40215* (2013.01)

(58) Field of Classification Search
CPC ............. H04L 1/0045; H04L 12/40013; H04L 12/40026; H04L 12/40052; H04L 2012/40215
See application file for complete search history.

(56) References Cited

U.S. PATENT DOCUMENTS

| | | | |
|---|---|---|---|
| 7,595,661 B2 * | 9/2009 | Kim | H04L 25/0292 326/82 |
| 9,362,915 B1 * | 6/2016 | Phillippe | H04L 25/0272 |
| 10,209,723 B2 * | 2/2019 | Huang | G05F 1/56 |
| 10,785,066 B1 | 9/2020 | van Dijk | |
| 10,791,002 B2 | 9/2020 | de Haas et al. | |

(Continued)

FOREIGN PATENT DOCUMENTS

| | | |
|---|---|---|
| DE | 10 2005 037723 A1 | 2/2007 |
| WO | WO 2018/104929 A1 | 6/2018 |

OTHER PUBLICATIONS

NXP; "NXP's Mantis CAN transceivers approved by Volkswagen for chokeless use in vehicles"; Phys Org; retrieved from the Internet https://phys.org/news/2014-01-nxp-mantis-transceivers-volkswagen-chokeless.html; 3 pages (Jan. 22, 2014).

(Continued)

*Primary Examiner* — Henry Tsai
*Assistant Examiner* — Christopher A Daley

(57) ABSTRACT

A Controller Area Network (CAN) system, method, and circuit are provided with a dual mode bus line termination circuit connected between signal lines of a serial bus and optimized for both differential and single-ended communication modes over the serial bus, where the dual mode bus line termination circuit includes first and second resistance termination paths connected in parallel between first and second bus wires of the serial bus to provide an odd mode termination impedance ($R_{ODD}$) that matches an impedance of the serial bus when operating in the differential communication mode, and to also provide an even mode termination impedance ($R_{EVEN}$) that matches an impedance of the serial bus when operating in the single-ended communication mode.

16 Claims, 10 Drawing Sheets

(56) References Cited

U.S. PATENT DOCUMENTS

| | | | |
|---|---|---|---|
| 10,826,719 B2 | 11/2020 | Muth et al. | |
| 10,838,906 B1 | 11/2020 | van Dijk | |
| 11,038,508 B2 | 6/2021 | de Haas et al. | |
| 11,061,844 B2* | 7/2021 | de Haas | G06F 13/4027 |
| 2010/0033165 A1 | 2/2010 | Rostamzadeh et al. | |
| 2012/0249257 A1 | 10/2012 | Takahashi et al. | |
| 2013/0300455 A1* | 11/2013 | Thirugnanam | H03K 19/018514 |
| | | | 326/82 |
| 2017/0026037 A1* | 1/2017 | Huang | G05F 1/56 |
| 2019/0215233 A1 | 7/2019 | Huang et al. | |
| 2020/0403823 A1 | 12/2020 | van Dijk | |
| 2021/0406138 A1* | 12/2021 | van Dijk | H04L 12/40182 |

OTHER PUBLICATIONS

European Application No. 21170155.2, dated Apr. 23, 2021, entitled Additional Communication in Standardized Pinout of a Bidirectional Interface Between a First and a Second Communication Device.

European Application No. 21177600.0 filed Jun. 3, 2021, entitled Transceiver Device.

European Application No. 21177602.6 filed Jun. 3, 2021 entitled Transceiver Device.

NIX B.V.; TJA1055—Enhanced fault-tolerant Can transceiver; Product Data Sheet, Rev. 5; 26 pages (Dec. 6, 2013).

\* cited by examiner

CONTROLLER AREA NETWORK TERMINATION SCHEME

FIELD OF THE INVENTION

The present disclosure is directed in general to field of data communications. In one aspect, the present disclosure relates to a network node transceiver, such as a Controller Area Network (CAN) transceiver, and associated computer programs, systems, and methods of operation for protecting the integrity of data communications between networked electronic control units.

BACKGROUND

Automotive vehicles increasingly include integrated circuit computer systems—such as electronic control units (ECUs), microcontrollers (MCUs), power train control modules (PCM), System(s)-on-a-Chip (SoC), and System(s)-in-a-Package (SiP)—that are connected together over a network or system bus to form an automotive vehicle network. Examples of in-vehicle network (IVN) buses include, but are not limited to, Controller Area Networks (CAN), CAN with Flexible Data-Rate (CAN FD), CAN data link layer protocol (CAN XL), Local Interconnect Networks (LIN), FlexRay, Ethernet-based network buses, and other types. For example, a controller area network (CAN) bus is a message-based communications bus protocol that is often used within automobiles to enable communications between various electronic control units (ECUs) which perform various control applications, such as for airbags, antilock brakes, cruise control, electric power steering, audio systems, windows, doors, mirror adjustment, battery and recharging systems for hybrid/electric cars, and many more. The CAN bus protocol is used to enable communications between the various bus devices. As will be appreciated, different applications have different levels of data safety requirements which can present data integrity challenges for computer systems running the applications. For example, a microcontroller unit may be used to control an automatic braking application which processes data having the highest Automotive Safety Integrity Level (ASIL) level (e.g., ASIL D) such that the data integrity must be ensured.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
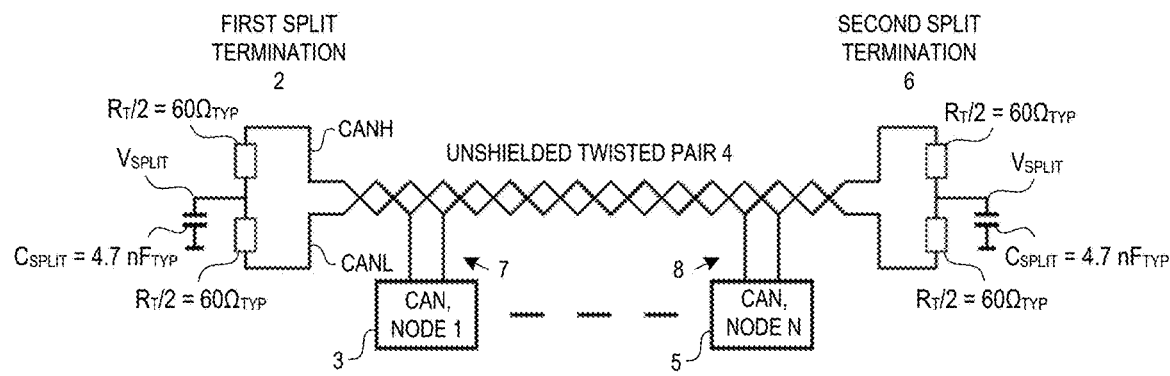
FIG. 1 depicts a simplified block diagram of a CAN network with multiple CAN nodes connected to a twisted pair cable having conventional resistance termination circuits.

A dual mode bus termination circuit, apparatus, system, and methodology are described to provide an improved termination scheme on a dual-wire network bus that is optimized for both differential and single-ended communication modes, thereby providing a reduced cost, backward-compatible solution with improved performance when operating the dual-wire network bus in single-ended communication mode and without performance loss when operating the dual-wire network bus in differential communication mode. In selected embodiments, the dual mode bus termination scheme is provided for a Controller Area Network (CAN) bus that includes first and second resistance termination paths connected in parallel between the twisted wire pair of the CAN bus to provide an odd mode termination impedance ($R_{ODD}$) that matches the characteristic impedance (e.g., 120Ω) of a CAN bus cable operating in a differential communication mode, and to also provide an even mode termination impedance ($R_{EVEN}$) that matches the characteristic impedance (e.g., 300Ω) of a CAN bus cable operating in a single-ended communication mode. This may be accomplished by connecting a first 150Ω resistor between the twisted wire pair of the CAN bus to form the first resistance termination path, and by connecting a pair of second 300Ω resistors in a split termination circuit between the twisted wire pair of the CAN bus to form the second resistance termination path. By providing a dual mode bus termination circuit that can match both the even and odd mode impedances of a CAN bus cable operating in single-ended and differential communication modes, a modified CAN transceiver can be used to simulate redundant CAN system by operating on a single wire when a failure is present on the other wire without loss of performance in the communication speed (bitrate). In this way, significant system cost savings may be obtained by using the dual mode bus termination circuit with a modified CAN transceiver to eliminate the requirement for an additional redundant CAN channel and transceiver(s). In addition, the disclosed dual mode bus termination circuit does not negatively impact EMC performance in case of operating in odd mode when there is no failure present on the dual-wire network bus. While described with reference to an example CAN bus, the disclosed bus termination circuit, apparatus, system, and methodology may be used with other dual-wire network bus networks.

As described below, the disclosed embodiments can be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. In addition, it will be appreciated that the techniques described herein can be applied to any type of computer network system, including but not limited to computer systems connected in an in-vehicle network, such as a CAN, CAN FD, CAN XL, LIN, FlexRay, Ethernet-based network, and the like. Although in some embodiments a specific type of CAN is described, it should be noted that the embodiments are not restricted to a specific type of CAN.

While there are solutions for protecting data integrity in sections of the vehicle network, such solutions do not provide efficient and cost-effective end-to-end protection for data communications, particularly for applications (e.g., ASIL D) where a high level of safety is required. To provide end-to-end data protection, existing data integrity solutions may include redundancy in the design of all the hardware elements which generate, modify and/or store the message. For example, data integrity of communications over a first CAN channel between a first set of CAN nodes can be protected by implementing a redundant CAN channel with an additional set of CAN nodes when an error is detected in the first CAN channel and/or first set of CAN nodes. Of course, such redundancy solutions add significant overhead to the design, increase the die size, and impose greater power consumption. In other solutions, a redundant CAN system can be mimicked by using a modified CAN transceiver that is able to operate on a single wire of existing CAN buses when a failure is present on the other wire of a twisted pair bus. While this approach can achieve significant system cost savings (even when the modified CAN transceiver is more expensive) as there is only a need for a single pair of wires, there are significant performance and/or functionality losses associated with operating in the single-ended communication mode. As seen from the foregoing, the existing solutions for protecting the integrity of data communications are extremely difficult at a practical level by virtue of the challenges with meeting the functionality and/or performance requirements and cost constraints for providing data protections across the entire automotive vehicle network.

To provide additional details for an improved contextual understanding of the present disclosure, reference is now made to FIG. 1 which depicts a simplified block diagram of a CAN network 10 in which multiple CAN nodes 3, 5 (e.g., CAN Node 1-CAN Node N) are connected to a CAN bus or twisted pair cable 4 which is includes conventional resistance termination circuits 2, 6. As disclosed, the CAN bus or twisted pair cable 4 includes CANH and CANL wires that communicate a differential signal between the multiple CAN nodes 3, 5 via stubs 7, 8. The CAN bus wires CANH, CANL carry analog differential signals between the CAN nodes 3, 5, and may operate in accordance with the ISO 11898-2 protocol for normal operations on the data link layer. Termination for the CAN bus 4 is typically implemented at the endpoints of the network with the "split-termination" circuits 2, 6 which offer low-pass filtering for unwanted common-mode signals to improve electromagnetic compatibility (EMC) performance. In particular, each of the first and second split termination resistors circuits 2, 6 include a pair of series-connected 60Ω resistors connected between the twisted wire pair of the CAN bus to form a resistance termination path in which a split voltage VSPLIT at the shared node between the series-connected resistors is connected over a splitting capacitor having a predetermined capacitance (e.g., CSPLIT=4.7 nF).

As will be appreciated, each CAN node or device (e.g., 3, 5) that is coupled to the CAN bus 4 may include a CAN controller and transceiver (not shown). In selected embodiments, the CAN controller may be implemented by a processor, such as a microprocessor, configured to implement a CAN protocol of operation within the CAN bus network 10. Each CAN controller may contain one or more host cores and is configured to support application software that implements the CAN signaling protocol. In addition, each CAN controller is typically connected to at least one device (not shown) such as a sensor, an actuator, or some other control device and are programmed to determine the meaning of received messages and to generate appropriate outgoing messages. To this end, the CAN controller may include hardware logic and memory buffers for implementing data link layer transmit and receive operations as is known in the field. For example, in receive operations, a CAN controller stores received serial bits from the transceiver until an entire message is available for fetching by the microcontroller. The CAN controller can also decode the CAN messages according to the standardized frame format of the CAN protocol. In transmit operations, the CAN controller receives and transmits messages as serial bits in the CAN data frame format to the CAN transceiver.

In operation, the CAN transceiver is connected to provide a communication interface implement physical layer operations between the CAN controller with the CAN bus 4. For example, in receive operations, a CAN transceiver converts analog differential signals from the CAN bus 4 to serial digital signals that the CAN controller can interpret. The CAN transceiver may also protect the CAN controller from extreme electrical conditions on the CAN bus 4, such as electrical surges. In transmit operations, the CAN transceiver converts serial digital bits received from the CAN controller into analog differential signals that are sent on the CAN bus 4.

Figure 2:
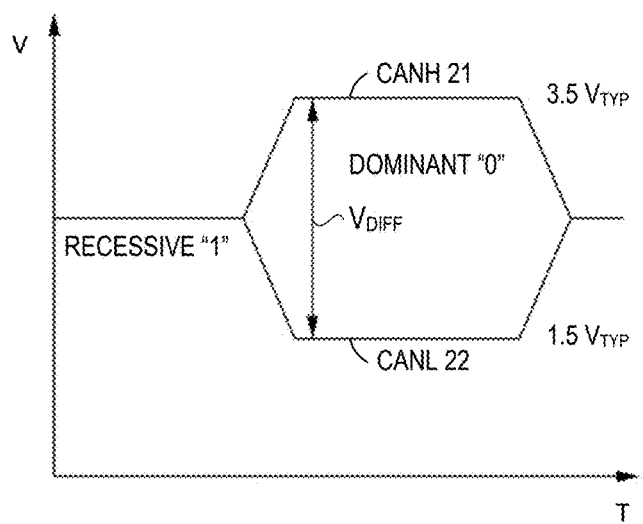
FIG. 2 is a timing waveform depiction of the normal operation of CANH and CANL signals which are driven to generate no differential signal that conveys a recessive signal or to generate a differential signal that conveys a dominant signal.

For an improved contextual understanding of the present disclosure, reference is now made to FIG. 2 which depicts a timing waveform 20 of the normal operation of CANH and CANL signals 21, 22 during normal operation of the CAN bus 4 when no errors are present. As depicted, the bus signals CANH, CANL are driven to a shared voltage value (e.g., 2.5V) so that there is no voltage differential between the CANH and CANL signals 21, 22 when conveying a recessive or "1" signal. In addition, the bus signals CANH, CANL are driven to different voltage values (e.g., 3.5V and 1.5V) so that there is a voltage differential VDIFF between the CANH and CANL signals 21, 22 when conveying a dominant or "0" signal.

As will be appreciated, communication problems can arise when error conditions impair or reduce the correct signaling of recessive and dominant values. Such communication problems can be disruptive and even dangerous with certain autonomous systems, such as Advanced Driver Assistance Systems (ADAS) systems which have significant functional safety requirements. For example, autonomous driving (AD) vehicle systems which combine sensors, actuators, communication elements and lines, computational elements, and decision-making instances in a CAN network must comply with the functional safety and its requirements for vehicle systems or sub-systems using the Automotive Safety Integrity Level (ASIL) classes introduced in ISO 26262. More specifically, critical communication systems or sub-systems, which may include a CAN bus network and nodes, such as shown in FIG. 1, need to ensure redundancy (high availability) to meet the extended requirements of functional safety. This is a relevant cost factor, adding to the overall cost level of the vehicle system. By providing an improved CAN bus termination scheme that is optimized for both a differential communication mode (during normal operation) and a single-ended communication mode (during an error mode of operation), the present disclosure is directed to mitigating loss of functionality following a communications failure of a CAN node whilst providing the required safety infrastructure.

For autonomous vehicle applications, the CAN channel redundancy benefits required for fail-operational behavior can arise from a variety of error conditions, including but not limited to errors in the transceiver, errors in the wiring harness, errors in the transceiver-to-microcontroller connection, and/or errors in the transceiver-to-wiring harness connection. Examples of "errors in the transceiver" can arise from an error in internal supply of the transceiver, an error in internal bias current in the transceiver, an error in the transmitter, an error in the receiver, or an error in the input/output cells to the microcontroller. In addition, the "errors in wiring harness" can arise from an open CANH or CANL wire, or an intermittently open CANH or CANL wire, or an open connection contact at the CANH or CANL wire, or an intermittently open connection contact at the CANH or CANL wire, or any open solder joint contact at the CANH or CANL wire, or an intermittently open solder joint contact at the CANH or CANL wire, or an open solder joint contact at the TXDL or RXDL of the CAN controller, or an intermittently open solder joint contact at the TXDL or RXDL of the CAN controller, or an open solder joint contact at the TXDL or RXDL of the CAN transceiver, or an intermittently open solder joint contact at the TXDL or RXDL of the CAN transceiver. As will be appreciated, these illustrative listing of errors are provided as examples only, and there can be additional errors that impair or reduce the ability of the CAN bus to properly operate in the differential communication mode, resulting in the communication being fail-degraded or not fail-operational.

Figure 3:
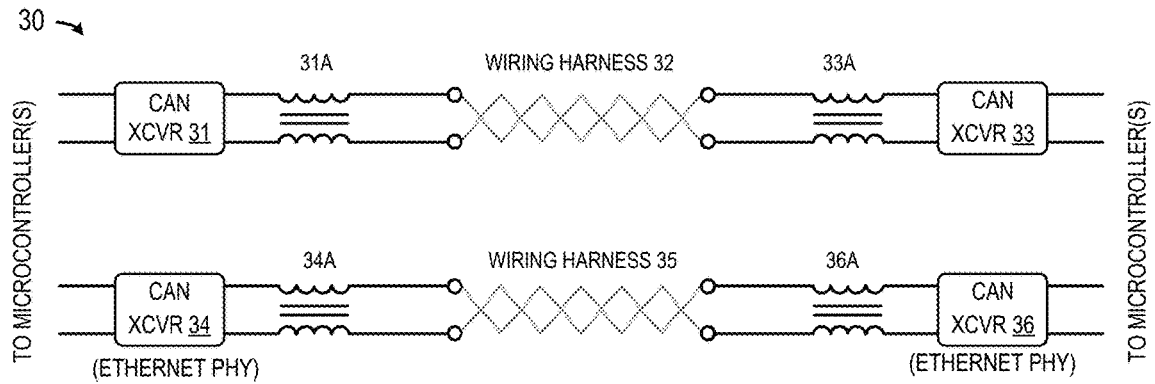
FIG. 3 illustrates a communication system which includes a primary CAN channel and a redundant CAN channel to protect against communication errors in the primary CAN channel.

To address situations where such errors arise, CAN channel communication system may include a redundant CAN channel to protect against communication errors in the primary CAN channel. For example, reference is now made to FIG. 3 which illustrates a CAN communication system 30 which includes a primary CAN channel 31-33 and a redundant CAN channel 34-36 to protect against communication errors in the primary CAN channel. In the primary channel, the twisted pair wiring harness 32 is connected to communicate a differential signal between the CAN transceiver nodes 31, 33 which are connected to the wiring harness 32 via common mode chokes 31A, 33A. Similarly, the redundant CAN channel includes twisted pair wiring harness 35 that is connected to communicate a differential signal between the CAN transceiver nodes 34, 36 which are connected to the wiring harness 35 via stubs 34A, 36A. In this solution, two CAN channels are implemented, but in other solutions, the redundant CAN channel could be replaced with an Ethernet channel. In either case, there are major drawbacks associated with the use of redundant channels. First of all, the system costs are significantly increased, especially due to the additional wiring harness and transceivers. In addition, the vehicle weight is increased which will lead to additional emissions in worst case resulting in penalties to be paid by OEMs.

In other solutions, a redundant CAN system can be mimicked or simulated by using a modified CAN transceiver that is able to operate on a single wire of existing CAN buses when a failure is present on the other wire of a twisted pair bus. In the modified CAN transceiver, the CAN bus can be monitored to detect a single error in the CAN network (e.g., error in transceiver, error in wiring harness, error in transceiver to microcontroller connection, error in transceiver connection to wiring harness) and to then shift from a default differential communication mode using two wires (such as shown in FIG. 2) to a single-ended communication mode of operation on a single wire. In particular, upon detecting a failure at the CANH or CANL wire, the modified CAN transceiver changes the default differential communication mode on the CANH and CANL wires to a single-ended communication mode on the CANL or CANH wire, respectively. As a result, there is a significant reduction in system costs since the first CAN channel can be implemented with the modified CAN transceiver, thereby eliminating the need for the redundant CAN channel (including its wiring harness and transceiver pair and common mode chokes). However, there are significant performance and/or functionality losses associated with operating in the single-ended communication mode when using the conventional "split-termination" circuits that are not optimized for both differential and single-ended communication modes.

In particular and referring back to FIG. 1, the depicted conventional resistance termination circuits 2, 6 only cover an appropriate "odd mode" termination ($R_{ODD}$) that is required for differential communication modes by providing an impedance of 120Ω that matches the impedance of the unshielded twisted pair 4. Since there is no appropriate "even mode" termination circuit that is needed for single-ended communication modes, the even mode impedance ($R_{EVEN}$) of the conventional resistance termination circuits equals 60Ω. This does not match with the impedance of the unshielded twisted pair 4 which has an "odd mode" and "even mode" impedance of 120Ω and 300Ω, respectively.

Figure 4:
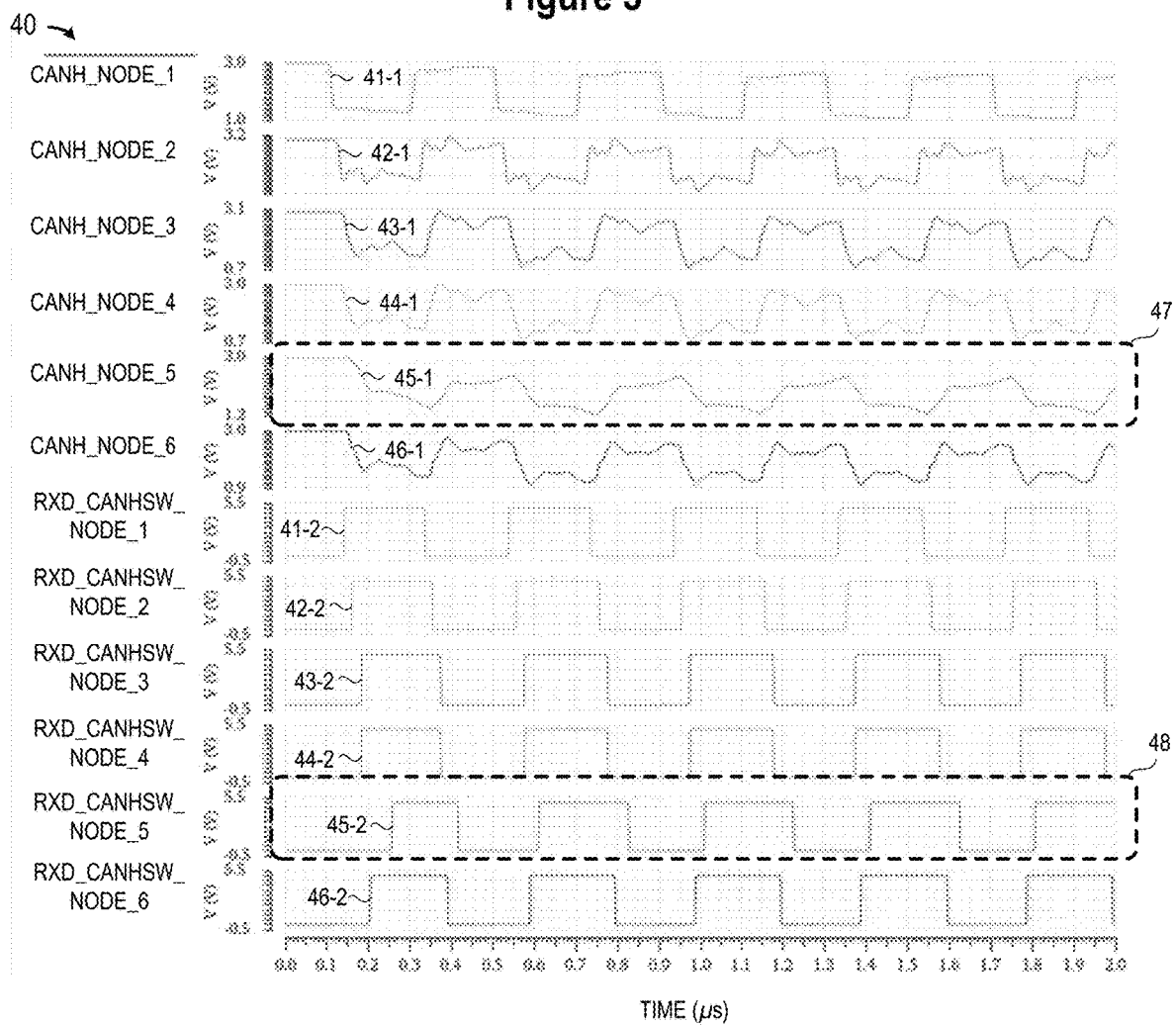
FIG. 4 depicts a computer simulated operation of a multi-node CAN network with conventional resistance termination circuits while operating in a single-ended communication mode.

To illustrate the performance limitations of using the conventional termination scheme, such as shown with the CAN bus network 10 depicted in FIG. 1, reference is now made to FIG. 4 which depicts a computer simulated waveforms 40 illustrating the operation of a multi-node CAN network which employs conventional resistance termination circuits while operating in a single-ended communication mode where there is a failure on the CANL wire (e.g., short to ground) so that communication in single-ended communication mode occurs on the CANH wire. In the depicted simulation result, six CAN nodes are connected in a CAN network which uses the conventional termination scheme (shown in FIG. 1), with the first CAN node (CANH_NODE_1) being the originating node for sending a message in a single-ended communication mode to the remaining nodes (CANH_NODE_2, CANH_NODE_3, . . . CANH_NODE_6). The signal timing waveforms (41-1, 42-1, . . . 46-1) show the wiring harness signals transmitted on the CANH wires (CANH_NODE_1, CANH_NODE_2, . . . CANH_NODE_6), respectively, by the CAN nodes 1-6. In addition, the signal timing waveforms (41-2, 42-2, . . . 46-2) show the received data RXD signals (RXD_CANHSW_NODE_1, RXD_CANHSW_2, . . . RXD_CANHSW_6) that are output, respectively, by the CAN nodes 1-6 to their corresponding microcontrollers.

As shown in the computer simulated waveforms 40, the conventional termination scheme is not sufficient to ensure single-ended communication. In particular and as shown with the dashed line 47, the signal timing waveform 45-1 for the fifth CAN node shows that the wiring harness signal transmitted on the CANH wires (CANH_NODE_5) has irregular or "sloppy" voltage pulse profiles which have degraded or "scaled down" voltage amplitudes (e.g., they do not return to the 3.0V value). The reduced amplitude of the signal leaves less margin for ground-noise. As a result, and as shown with the dashed line 48, the signal timing waveform 45-2 for the fifth CAN node shows that the received data RXD signal (RXD_CANHSW_5) has receive bit width timing values that are also irregular (e.g., too narrow) which can result in violations of pulse width requirements (e.g., minimum or maximum pulse width requirements). For example, it will be appreciated by those skilled in the art that the signal timing waveform 45-2 for the fifth CAN node violate the CiA601-4 v2.0.0 specification for SIC (signal improvement capability) transceivers.

Figure 5:
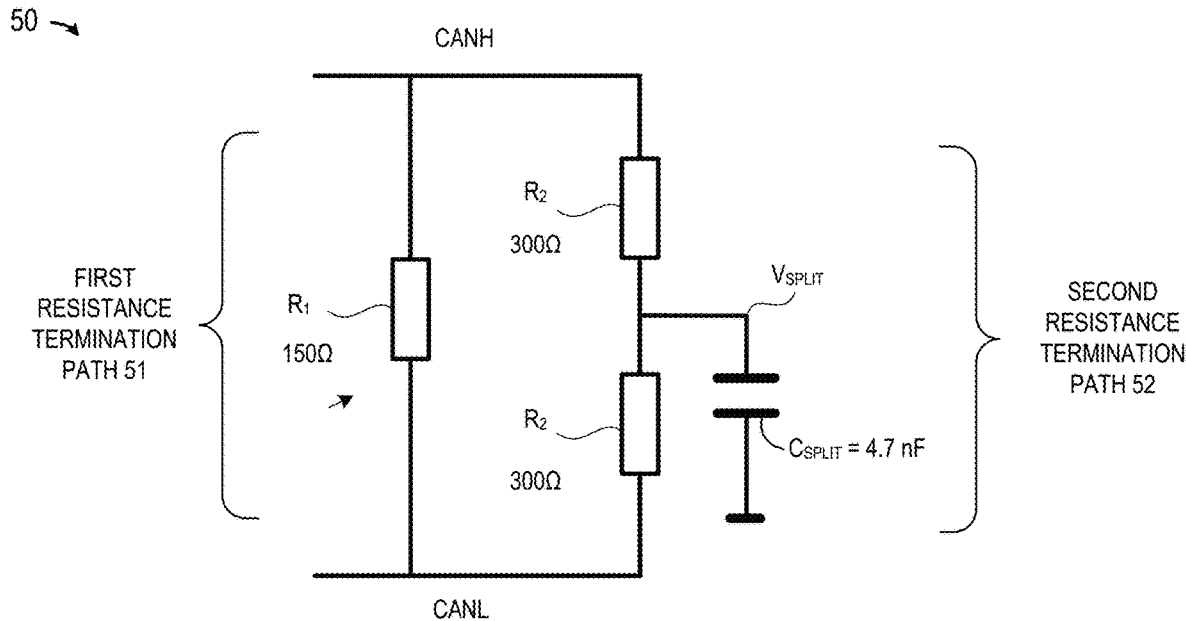
FIG. 5 depicts the circuit schematic diagram of a dual mode termination resistor circuit for implementing both differential and single-ended modes of CAN network operation in accordance with selected embodiments of the present disclosure.

To address these deficiencies with conventional approaches and others known to those skilled in the art, there is disclosed herein a method and apparatus for using a CAN bus termination scheme that is optimized for both differential and single-ended communication modes, thereby providing a reduced cost, backward-compatible solution with improved performance when operating the CAN network in single-ended communication mode and without performance loss when operating the CAN network in differential communication mode. In particular and with reference to FIG. 5, there is illustrated a circuit schematic diagram of a dual mode termination resistor circuit 50 for implementing both differential and single-ended modes of CAN network operation in accordance with selected embodiments of the present disclosure. In the depicted dual mode termination resistor circuit 50, first and second resistance termination paths 51, 52 are connected in parallel between the twisted wire pair of the CAN bus to provide an odd mode termination impedance ($R_{ODD}$) that matches the impedance (e.g., 120Ω) of a CAN bus cable operating in a differential communication mode, and to also provide an even mode termination impedance ($R_{EVEN}$) that matches the impedance (300Ω) of a CAN bus cable operating in a single-ended communication mode.

Those skilled in the art will appreciate that impedance matching refers to matching the output impedance of a circuit that transmits a signal and the input impedance of a circuit that receives the signal. In one or more embodiments, impedance matching is achieved when the odd mode termination impedance ($R_{ODD}$) is within at least 5-10% of the impedance of the CAN bus cable operating in a differential communication mode. In one or more embodiments, impedance matching is achieved when the even mode termination impedance ($R_{EVEN}$) is within at least 5-10% of the impedance of the CAN bus cable operating in a single-ended communication mode. To the end, the first resistance termination path 51 includes a first resistor $R_1$=150Ω connected between the twisted wire pair of the CAN bus. In addition, the second resistance termination path 52 includes a series-connected pair of second resistors $R_2$=300Ω connected in a split termination circuit between the twisted wire pair of the CAN bus so that a split voltage $V_{SPLIT}$ at the shared node between the series-connected resistors is connected over a splitting capacitor having a predetermined capacitance (e.g., $C_{SPLIT}$=4.7 nF). As will be appreciated, the values of the first and second resistors $R_1$, $R_2$ can be chosen so that the odd mode termination impedance ($R_{ODD}$) value is 120Ω, but other impedance values can be chosen which match the impedance of the CAN bus cable operating in a differential communication mode. Similarly, the even mode termination impedance ($R_{EVEN}$) value may be 300Ω, but other impedance values can be chosen to match the impedance of the CAN bus cable operating in a single-ended communication mode.

As disclosed herein, the specific resistance values for the resistors $R_1$ and $R_2$ which are used in a CAN network bus application are normally selected to be within specified tolerance value (e.g., +/−1%) of the identified resistor values (e.g., 148.5Ω<$R_1$<151.5Ω). Similarly, the typical capacitance value for the splitting capacitor in a CAN network bus application is normally $C_{SPLIT}$=4.7 nF, but its specific capacitance value can range for example between 1 nF and 100 nF. As will be appreciated, the values for the resistors $R_1$ and $R_2$ and splitting capacitor CSPLIT can be adjusted to meet the dual mode requirements of different network bus applications, with the second resistor $R_2$ having a specified value to match the even mode impedance of the cable in the network bus application when operating in a single-ended communication mode, and with the first resistor $R_1$ having a specified value which combines with the series-connected pair of second resistors $R_2$ to match the odd mode impedance of the cable in the network bus application when operating in a differential communication mode.

In operation, the dual mode termination resistor circuit 50 provides both an "even mode" termination (needed for single-ended communication) and an "odd mode" termination (needed for differential communication). In particular, the "even mode" impedance ($R_{EVEN}$) equals 300Ω of the dual mode termination resistor circuit 50, resulting in a typical resistor value of 300Ω for $R_2$. The typical value for $R_1$, to match the "odd mode" termination impedance ($R_{ODD}$) of the dual mode termination resistor circuit 50 can be calculated from:

$$R_{ODD} = \frac{R_1 \cdot 2R_2}{R_1 + 2R_2} = 120 \text{ Ω}$$

As seen from the foregoing, the even and odd mode impedances $R_{EVEN}$, $R_{ODD}$ provided by the dual mode termination resistor circuit 50 match the characteristic impedances of the unshielded twisted pair which has odd mode and even mode impedances of 120Ω and 300Ω, respectively.

Figure 6:
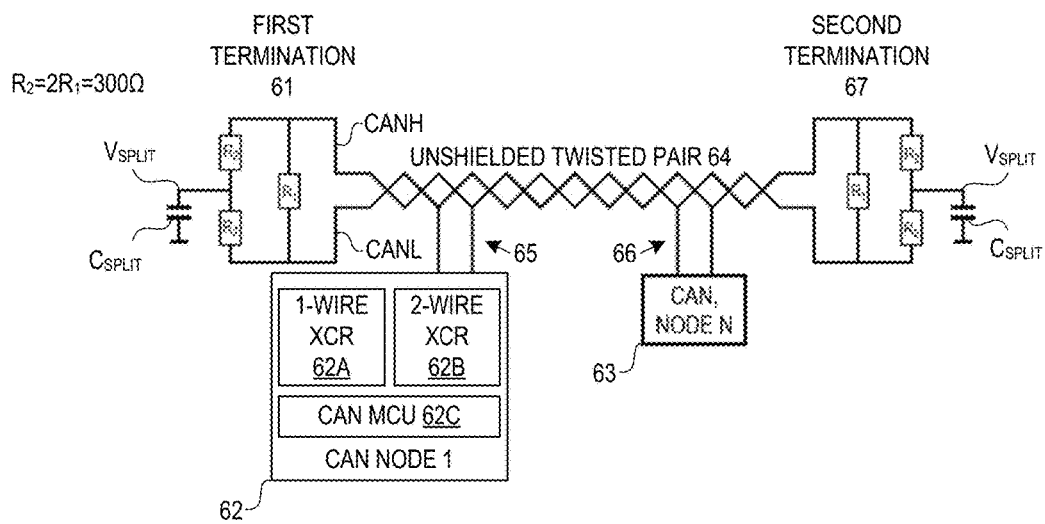
FIG. 6 depicts a simplified block diagram of a CAN network with multiple CAN nodes connected to a twisted pair cable having dual mode termination resistor circuits for implementing both differential and single-ended modes of CAN network operation in accordance with selected embodiments of the present disclosure.

For an improved understanding of selected embodiments of the present disclosure, reference is now made to FIG. 6 which depicts a simplified block diagram of a CAN network 60 with multiple CAN nodes 62, 63 (e.g., CAN Node 1-CAN Node N) connected to a CAN bus or twisted pair cable 64 that is provided with dual mode termination resistor circuits 61, 67 for implementing both differential and single-ended modes of CAN network operation. As disclosed, the twisted pair cable 64 includes CANH and CANL wires that can be used to communicate a differential signal or a single-ended signal between the multiple CAN nodes 62, 63 via stubs 65, 66. Termination for the CAN bus 64 is implemented at the endpoints of the network with termination circuits 61, 67 which match both the even and odd mode impedances of the CAN bus 64 operating in single-ended and differential communication modes. In particular, each of the first and second termination circuits 61, 67 include first and second resistance termination paths connected in parallel between the twisted wire pair of the CAN bus 64 to provide an odd mode termination impedance ($R_{ODD}$) that matches a first impedance (e.g., 120Ω) of a CAN bus 64 operating in a differential communication mode, and to also provide an even mode termination impedance ($R_{EVEN}$) that matches a second impedance (e.g., 300Ω) of a CAN bus 64 operating in a single-ended communication mode.

As disclosed, each CAN node or device (e.g., 62, 63) that is coupled to the CAN bus 64 may include a CAN microcontroller (MCU) (e.g., 62C) and a plurality of CAN transceivers (e.g., 62A-B) which are configured to transmit and receive data on the CAN bus 64 using a plurality of physical layer protocols. In selected embodiments, the CAN MCU (e.g., 62C) may be implemented by a processor, such as a microprocessor, configured to implement the plurality of physical layer protocols of operation within the CAN bus network 60. Each CAN MCU may contain one or more host cores and is configured to support application software that implements the CAN signaling protocol. In addition, each CAN MCU is typically connected to at least one device (not shown) such as a sensor, an actuator, or some other control device and are programmed to determine the meaning of received messages and to generate appropriate outgoing messages. In addition, the plurality of CAN transceivers (e.g., 62A-B) may include a first 1-wire CAN transceiver 62A that is configured to transmit/receive data using a single-ended signaling protocol, and a second 2-wire CAN transceiver 62B that is configured to transmit/receive data using a differential signaling protocol. Each CAN node or device 62, 63 may also include monitoring circuitry in either the CAN MCU or CAN transceivers which is connected and configured to determine a measured property of the CAN bus 64 which indicates an error condition. In response to detecting an error condition, the CAN node or device (e.g., 62, 67) reconfigures the transceiver circuitry to shift from a default differential signaling mode for transmitting and receiving data using the 2-wire CAN transceiver 62B, and to instead use a single-ended signaling mode for transmitting and receiving data using the 1-wire CAN transceiver 62A.

By providing each CAN node or device (e.g., 62, 63) with the ability to reconfigure the physical layer protocols for transmitting and receiving data to operate on a single wire when a failure is present on the other wire, each CAN node can simulate redundant CAN system without requiring the significant system costs of providing redundant CAN nodes and twisted pair cables (even when the proposed CAN node or device is more expensive) since there is only a need for a single pair of wires to effect backup communication. And by providing the CAN bus 64 with dual mode termination resistor circuits 61, 67 which implement both differential and single-ended modes of CAN network operation, the disclosed CAN network 60 provides a reduced cost, backward-compatible solution with improved performance when operating the CAN network in single-ended communication mode and without performance loss when operating the CAN network in differential communication mode.

Figure 7:
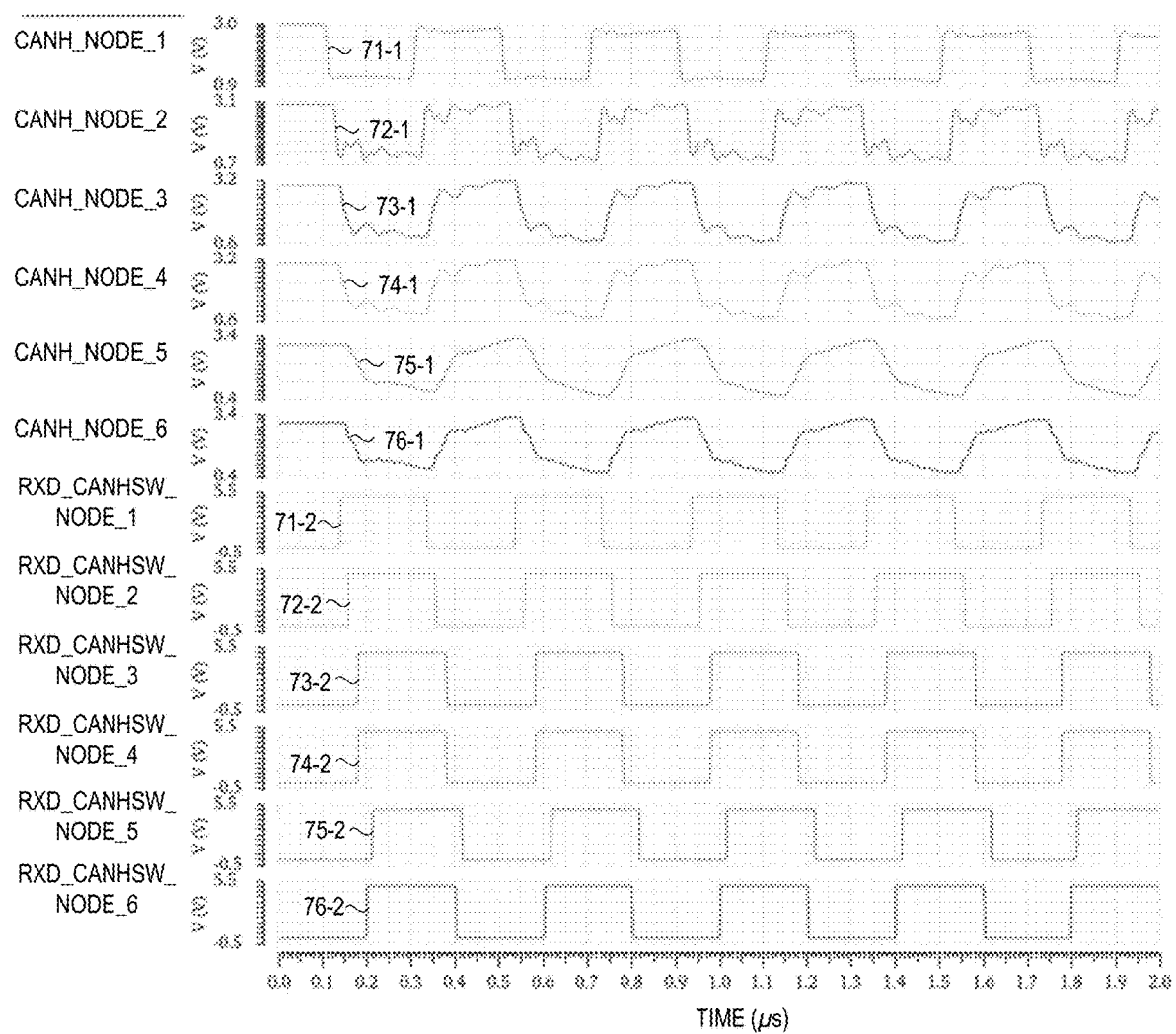
FIG. 7 depicts a computer simulated operation of a multi-node CAN network which employs dual mode termination resistor circuits while operating in a single-ended communication mode in accordance with selected embodiments of the present disclosure.

To illustrate the performance benefits of using dual mode termination resistor circuits, such as shown with the CAN bus network 60 depicted in FIG. 6, reference is now made to FIG. 7 which depicts a computer simulated waveforms 70 illustrating the operation of a multi-node CAN network which employs dual mode termination resistor circuits while operating in a single-ended communication mode where there is a failure on the CANL wire (e.g., short to ground) so that communication in single-ended communication mode occurs on the CANH wire. In the depicted simulation result, six CAN nodes are connected in a CAN network which uses the dual mode termination scheme, with the first CAN node (CANH_NODE_1) being the originating node for sending a message in a single-ended communication mode to the remaining nodes (CANH_NODE_2, CANH_NODE_3, . . . CANH_NODE_6). The signal timing waveforms (71-1, 72-1, . . . 76-1) show the wiring harness signals transmitted on the CANH wires (CANH_NODE_1, CANH_NODE_2, . . . CANH_NODE_6), respectively, by the CAN nodes 1-6. In addition, the signal timing waveforms (71-2, 72-2, . . . 76-2) show the received data RXD signals (RXD_CANHSW_NODE_1, RXD_CANHSW_2, . . . RXD_CANHSW_6) that are output, respectively, by the CAN nodes 1-6 to their corresponding microcontrollers.

As shown in the computer simulated waveforms 70, the dual mode termination scheme is sufficient to ensure single-ended communication. In particular, each of the signal timing waveforms 71-1, 72-1, . . . 76-1 show that the wiring harness signals transmitted on the CANH wires (CANH_NODE_1-CANH_NODE_6) have a regular voltage pulse profile which is not "scaled down" but instead fully returns to the 3.0V value. As a result, the signal timing waveforms 71-2, 72-2, . . . 76-2 for the CAN nodes show that the received data RXD signals (RXD_CANHSW_1-RXD_CANHSW_6) have receive bit width timing values that do not violate bit timing requirements, such as those set forth in the CiA601-4 v2.0.0 specification for SIC (signal improvement capability) transceivers.

Figure 8:
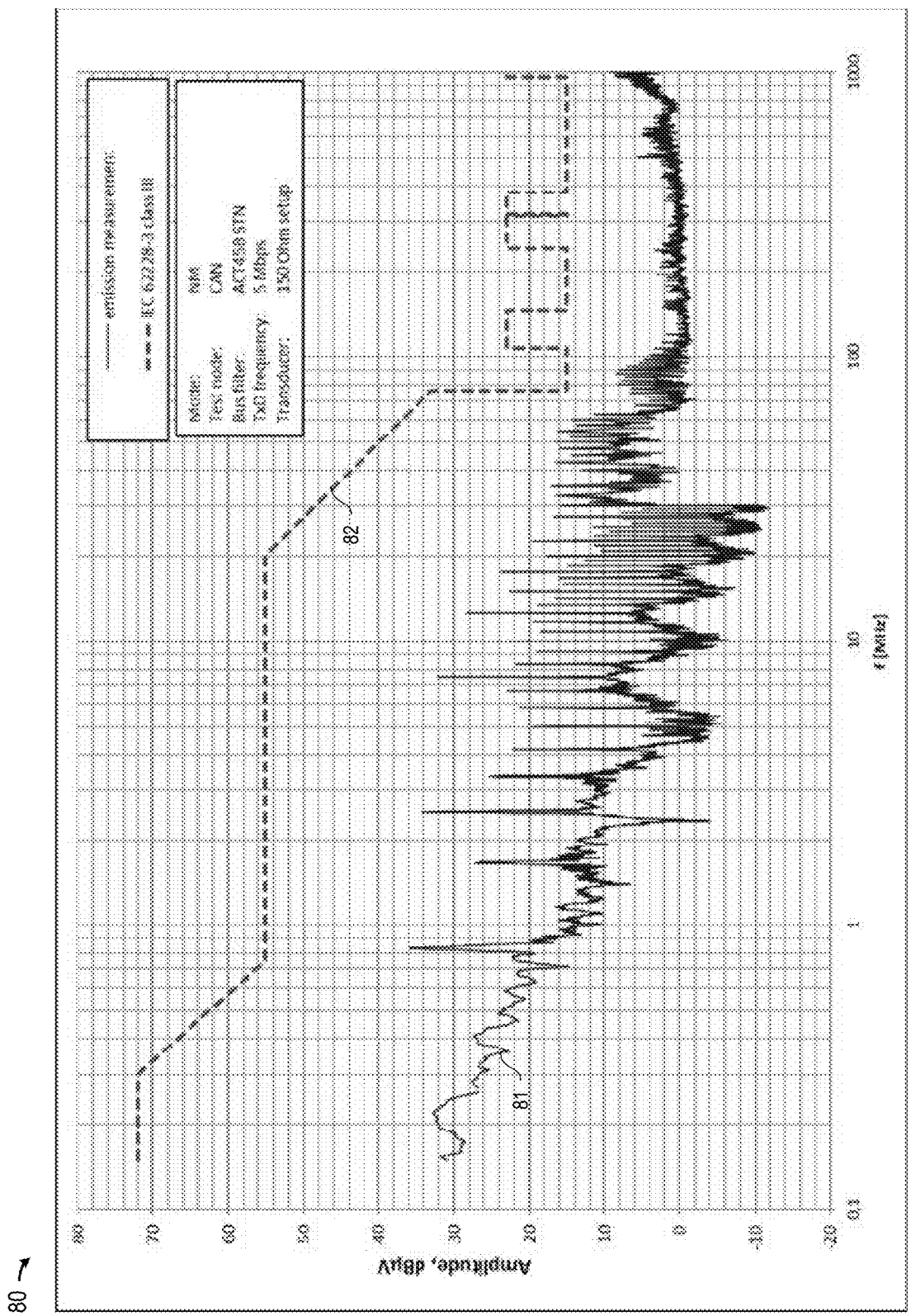
FIG. 8 depicts the emission of RF disturbances measured according to the International Electrotechnical Commission (IEC) 62228-3 test specification and associated example of specification limits of a CAN network which employs conventional resistance termination circuits.

In addition to providing an effective way for improving the performance of a CAN network to support both differential and single-ended communication modes, the disclosed dual mode bus termination circuit, apparatus, system, and methodology comply with the electromagnetic compatibility requirements to operate without error in its intended electromagnetic environment. To demonstrate this, reference is now made to FIG. 8 which is a voltage-frequency plot 80 depiction of the trace emission measurement 81 of RF disturbances measured according to the IEC 62228-3:2019 and associated example of a maximum specification limit line 82 of a CAN network which employs conventional resistance termination circuits. As understood by those skilled in the art, EMC requirements are very challenging to meet in CAN networks. In the voltage frequency plot 80, the example maximum specification limit line 82 is shown according to IEC 62228-3 standard which specifies test and measurement methods, test conditions, test setups, test procedures, failure criteria and test signals for the EMC evaluation of CAN transceivers. Finally, the trace emission measurement 81 shows the measurements for CAN network which employs conventional resistance termination circuits operating in a differential communication mode. As seen from the trace emission measurement 81, the maximum specification limit line 82 is not violated by the CAN network with conventional resistance termination circuits when operating in a differential communication mode.

Figure 9:
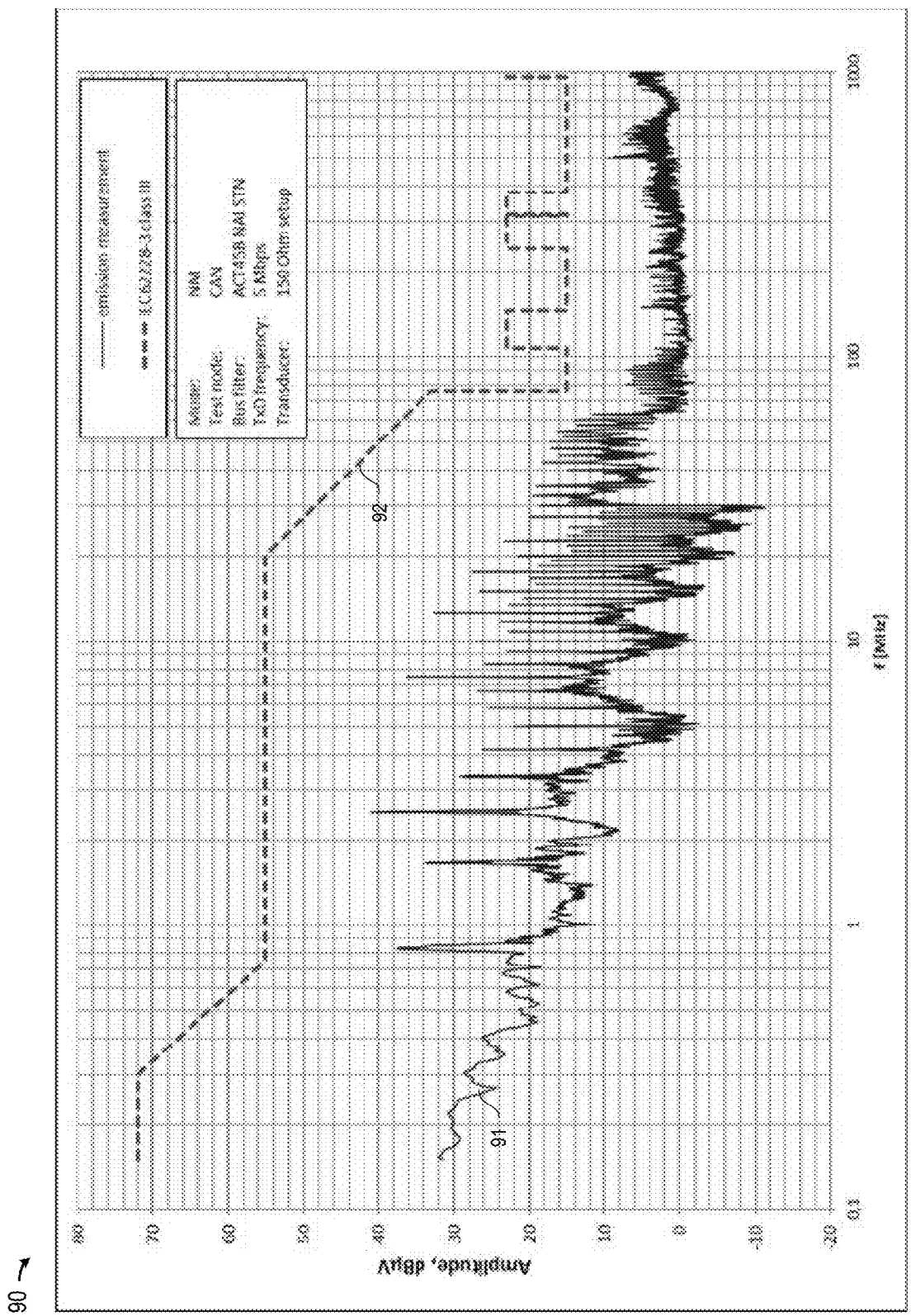
FIG. 9 depicts the emission of RF disturbances measured according to the IEC 62228-3 test specification and associated example of specification limits of a CAN network which employs dual mode termination resistor circuits in accordance with selected embodiments of the present disclosure.

For comparison purposes, reference is now made to FIG. 9 which is a voltage-frequency plot 90 showing the emission of RF disturbances measured according to IEC 62228-3:2019 and associated example of limit 92 for emission of RF disturbances made in a CAN network which employs dual mode termination resistor circuits in accordance with selected embodiments of the present disclosure. In the voltage-frequency plot 90, an example of a maximum specification limit line 92 is shown according to IEC 62228-3 standard which specifies test and measurement methods, test conditions, test setups, test procedures, failure criteria and test signals for the EMC evaluation of CAN transceivers. Finally, the trace emission measurement 91 shows the measurements for CAN network which employs the dual mode termination resistor circuits operating in a differential communication mode. As seen from the trace measurement 91, the EMC limit 92 is not violated by the CAN network with dual mode termination resistor circuits when operating in a differential communication mode. As a result, in cases where there is no CAN wire failure or error in the CAN network, the CAN network that is connected to dual mode termination resistor circuits does not negatively impact the EMC performance when operating in a differential or 2-wire communication mode.

Figure 10:
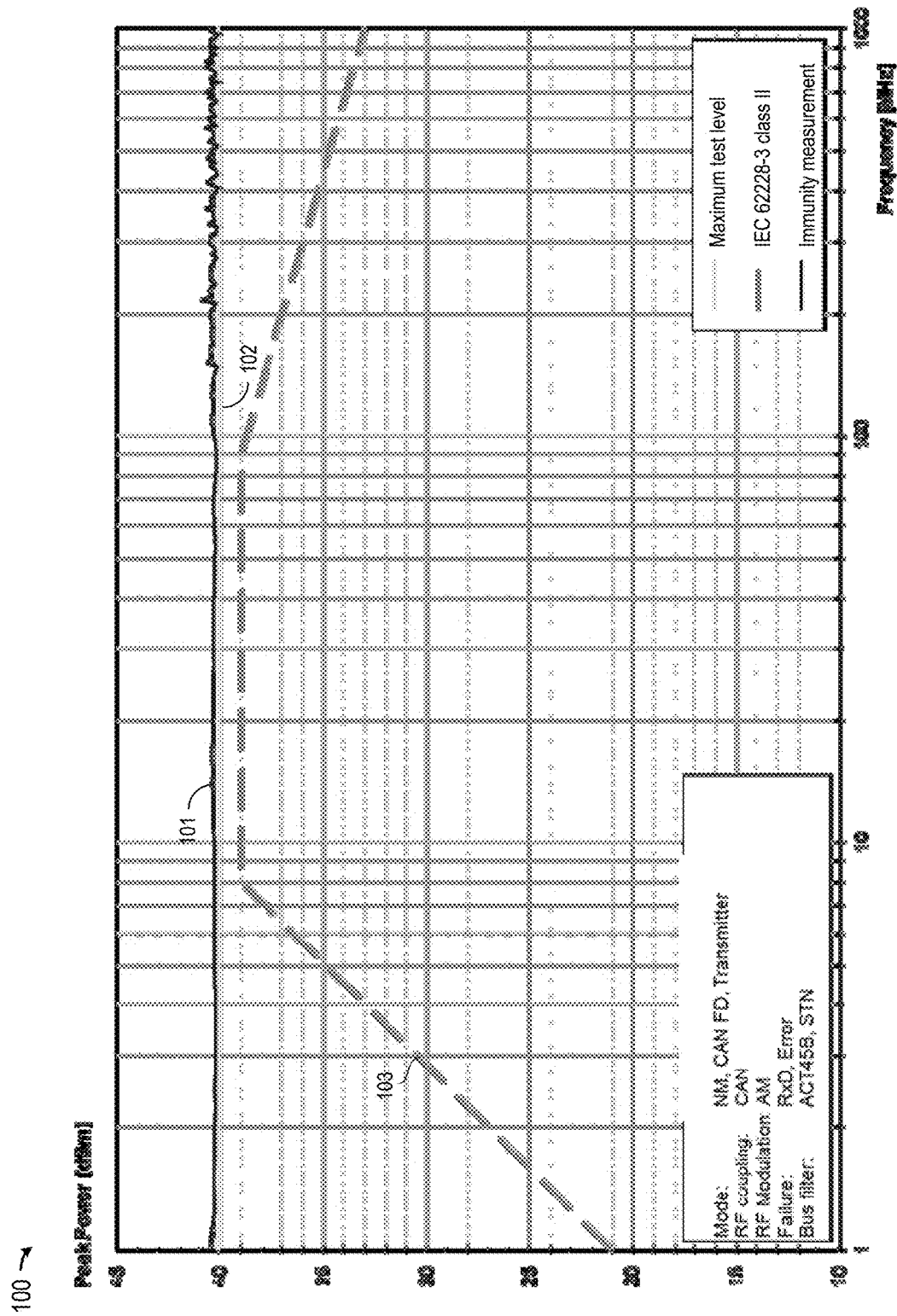
FIG. 10 depicts the immunity to RF disturbances measured according to the IEC 62228-3 test specification and associated example of specification limits of a CAN network which employs conventional resistance termination circuits.

In addition to meeting EMC performance requirements when operating in a differential or 2-wire communication mode, the disclosed dual mode bus termination circuit, apparatus, system, and methodology comply with requirements for immunity against RF disturbances. To demonstrate this, reference is now made to FIG. 10 which is a peak power-frequency plot 100 showing the immunity measurement 101 and example of associated minimum specification limit 103 according to IEC 62228-3:2019 of a CAN network which employs conventional resistance termination circuits. As understood by those skilled in the art, EMI requirements are very challenging to meet in CAN networks.

In the peak power-frequency plot 100, an example of a minimum specification limit line 103 is shown for the measurement. In addition, a maximum specification limit line 102 shows the maximum test limit for the measurement. Finally, the immunity measurement 101 shows the measurements for CAN network which employs conventional resistance termination circuits operating in a differential communication mode. As seen from the immunity measurement 101, the limit 103 is not violated by the CAN network with conventional resistance termination circuits when operating in a differential communication mode.

Figure 11:
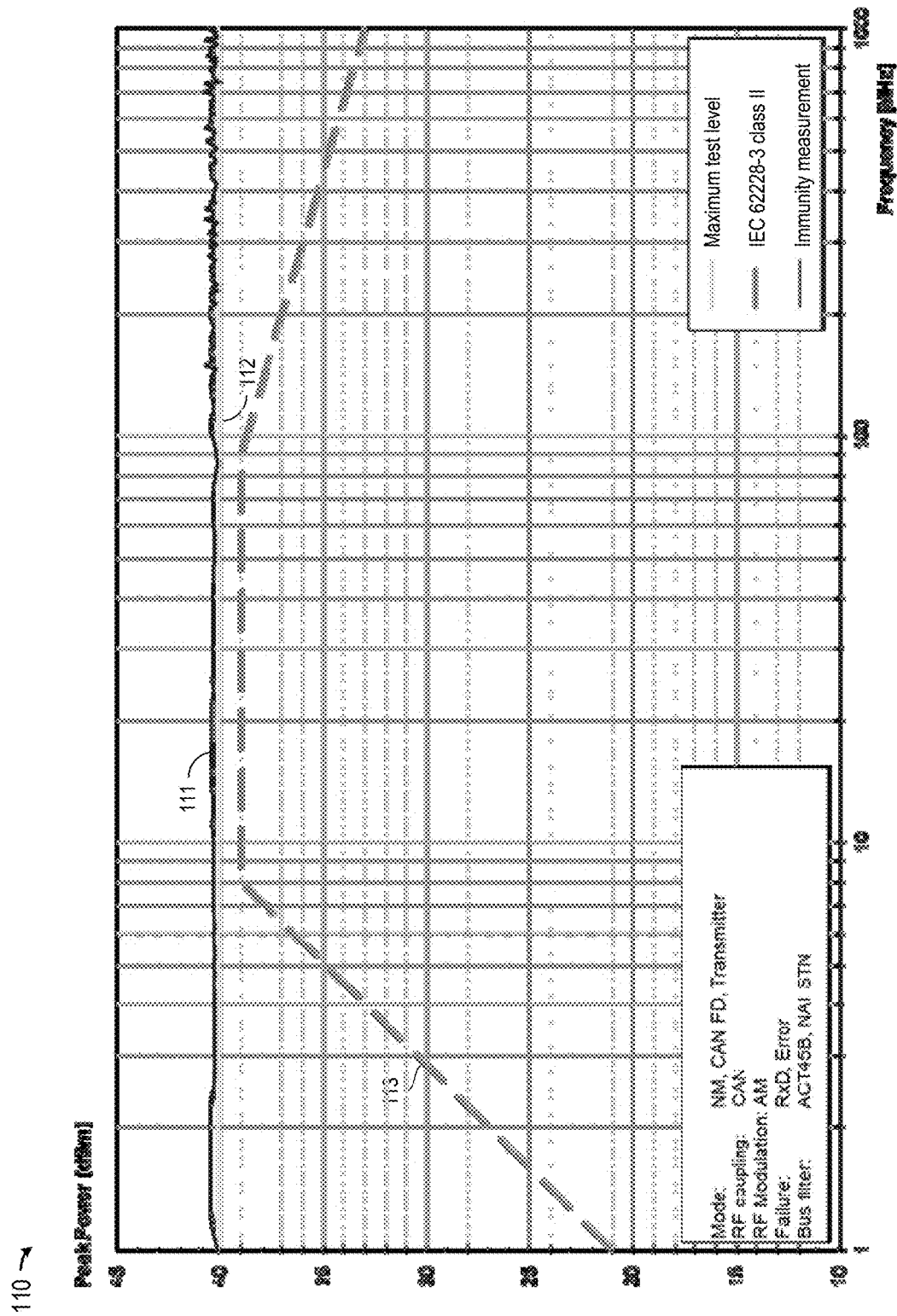
FIG. 11 depicts immunity to RF disturbances measured according to the IEC 62228-3 and associated example of specification limits of a CAN network which employs dual mode termination resistor circuits in accordance with selected embodiments of the present disclosure.

For comparison purposes, reference is now made to FIG. 11 which is a peak power-frequency plot 110 showing the RF-disturbance measurement 111 and example of associated minimum specification limit 113 according to IEC 62228-3:2019 of a CAN network which employs dual mode termination resistor circuits in accordance with selected embodiments of the present disclosure. In the peak power-frequency plot 110 a minimum specification limit line 113 is shown for the measurement. In addition, a second maximum specification limit line 112 shows the maximum test limit for the measurement. Finally, the trace immunity measurement 111 shows the measurements for CAN network which employs the dual mode termination resistor circuits operating in a differential communication mode. As seen from the trace immunity measurement 111, the immunity limit 113 is not violated by the CAN network with dual mode termination resistor circuits when operating in a differential communication mode. As a result, in cases where there is no CAN wire failure or error in the CAN network, the CAN network that is connected to dual mode termination resistor circuits does not negatively impact the EMI performance when operating in a differential or 2-wire communication mode.

Figure 12:
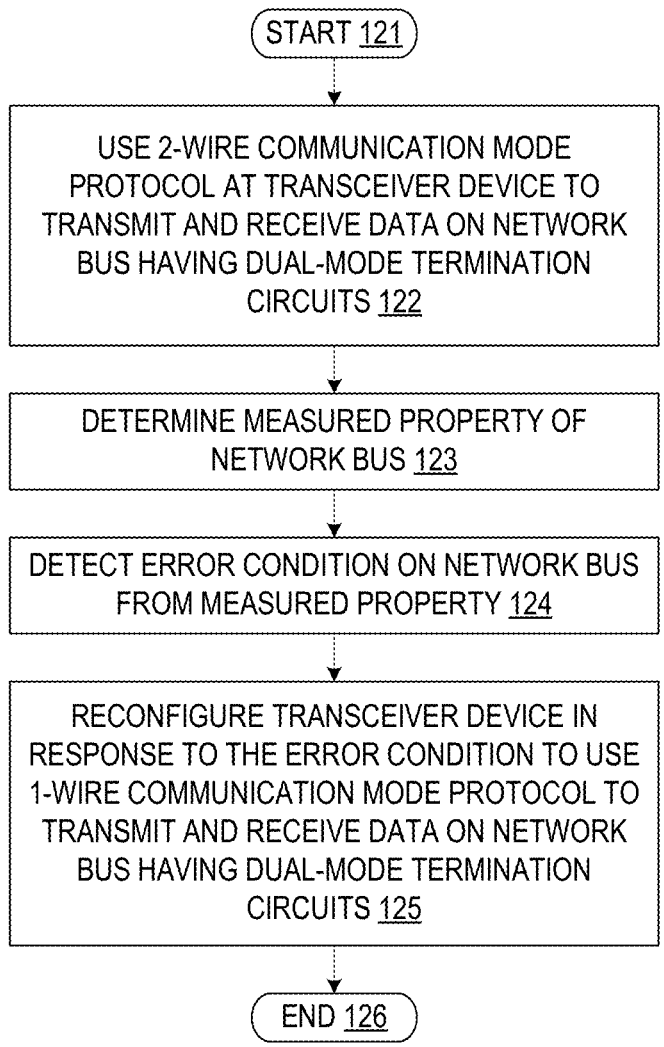
FIG. 12 illustrates a simplified flow chart showing the process for operating a transceiver in a network bus having dual-mode termination circuits in accordance with selected embodiments of the present disclosure.

To further illustrate selected embodiments of the present disclosure, reference is now made to FIG. 12 which is a simplified flow chart 120 illustrating an example process for operating a transceiver in a network bus having dual-mode termination circuits in accordance with selected embodiments of the present disclosure. In describing the methodology, the description is intended merely to facilitate understanding of various embodiments and not by way of limitation. Unless otherwise indicated, the steps may be provided in any desired order. Since the steps illustrated in FIG. 12 and described below are provided by way of example only, it will be appreciated that the sequence of illustrated steps may be modified, reduced or augmented in keeping with the alternative embodiments of the disclosure so that the method may include additional steps, omit certain steps, substitute or alter certain steps, or perform certain steps in an order different than that illustrated in FIG. 12. Thus, it will be appreciated that the methodology of the present invention may be thought of as performing the identified sequence of steps in the order depicted, though the steps may also be performed in parallel, in a different order, or as independent operations that are combined.

Once the method starts (step 121), a transceiver device uses a two-wire communication mode protocol to transmit and receive data on a network bus having dual-mode termination circuits (step 122). In selected embodiments, the transceiver device is a CAN transceiver device connected to a CAN bus cable in a CAN network, where first and second bus wires are connected across a dual mode bus termination circuit that is optimized for both differential and single-ended communication modes by providing an odd mode termination impedance ($R_{ODD}$) that matches the characteristic impedance (e.g., 120Ω) of the CAN bus cable operating in a differential communication mode, and also providing an even mode termination impedance ($R_{EVEN}$) that matches the characteristic impedance (e.g., 300Ω) of the CAN bus cable operating in a single-ended communication mode. In selected embodiments, the dual mode bus termination scheme is provided with a first 150Ω resistor connected between the twisted wire pair of the CAN bus that forms a first resistance termination path, and with a pair of second 300Ω resistors connected in series between the twisted wire pair of the CAN bus with a shared node connected over a splitting capacitor to ground to form a second resistance termination path. In such embodiments, the transceiver device is configured to use a first physical layer protocol to operate the two-wire communication mode protocol.

At step 123, the method determines a measured property of the network bus. In selected embodiments, the transceiver device may include monitoring circuitry that is configured to measure one or more properties of the network bus. The measured property may be obtained periodically or otherwise repeatedly during use of the transceiver.

At step 124, the method detects an error condition on the network bus from the measured property. In selected embodiments, the transceiver device may include circuitry that is configured to receive the measured property of the network bus and to compare the measured property with one or more communication error entries stored in a look-up table. The diagnostic circuitry may compare the measured property with one or more communication error entries stored in a look-up table, and may indicate an error condition when the measured property falls outside of a tolerable range defined by the first physical layer protocol.

At step 125, the transceiver device is reconfigured in response to the error condition to use a one-wire communication mode protocol to transmit and receive data on the network bus having the dual-mode termination circuits. In embodiments where the transceiver device is a CAN transceiver device connected to a CAN bus cable in a CAN network, the first and second bus wires are connected across a dual mode bus termination circuit that is optimized for both differential and single-ended communication modes by providing an odd mode termination impedance ($R_{ODD}$) that matches the impedance (e.g., 120Ω) of the CAN bus cable operating in a differential communication mode, and also providing an even mode termination impedance ($R_{EVEN}$) that matches the impedance (e.g., 300Ω) of the CAN bus cable operating in a single-ended communication mode. In selected embodiments, the dual mode bus termination scheme is provided with a first 150Ω resistor connected between the twisted wire pair of the CAN bus that forms a first resistance termination path, and with a pair of second 300Ω resistors connected in series between the twisted wire pair of the CAN bus with a shared node connected over a splitting capacitor to ground to form a second resistance termination path. In such embodiments, the transceiver device is configured to use a second physical layer protocol to operate the one-wire communication mode protocol.

Figure 13:
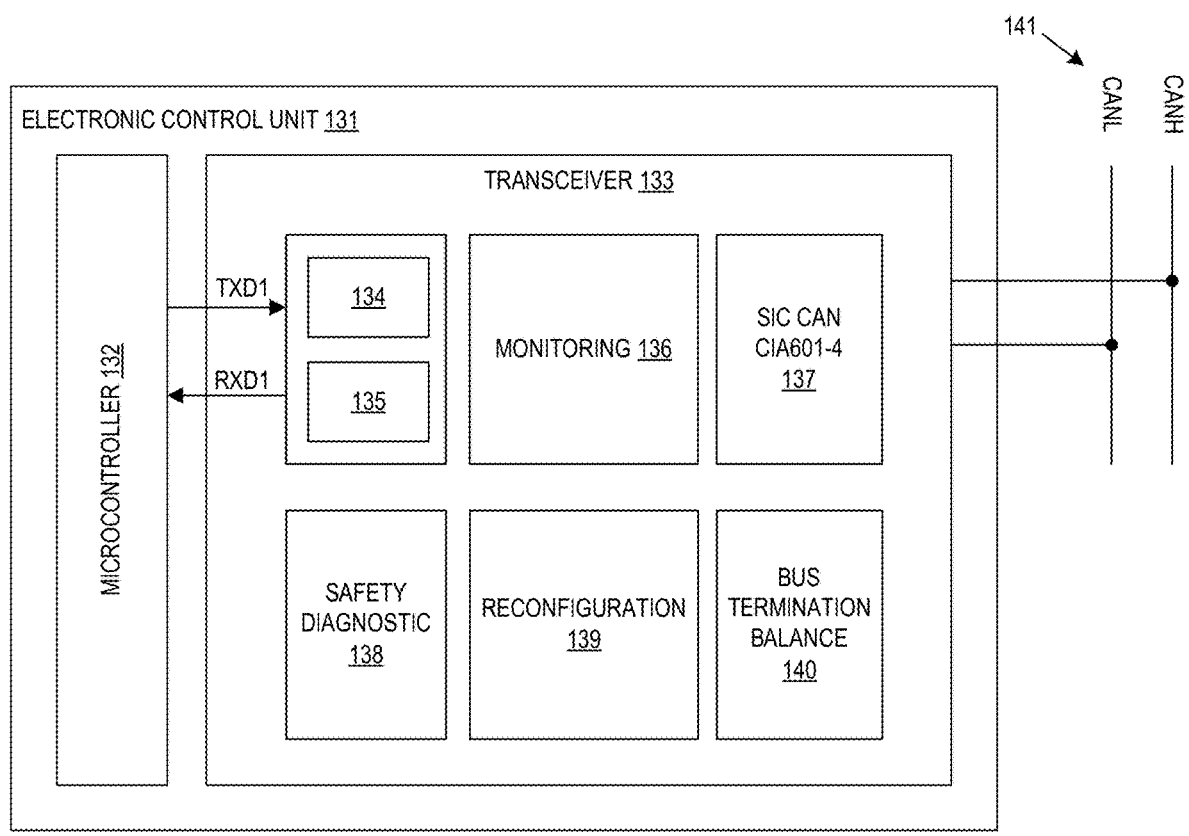
FIG. 13 depicts an example schematic block diagram of an electronic control unit that is suitable for use in accordance with selected embodiments of the present disclosure.

Turning now to FIG. 13, there is depicted an example schematic block diagram 130 of an electronic control unit (ECU) 131 suitable for use in selected embodiments of the present disclosure. As depicted, the ECU 131 includes a microcontroller 132 and a transceiver 133. The microcontroller may provide the program code and software instruction execution functionality to control the operations of the ECU 131. The transceiver 133 comprises a number of functional modules 134-140 as described below.

A monitoring module 136 may continuously assess the performance of the CAN, CANFD or any next generation CAN bus system, dynamically determine bus parameters and characteristics, and/or detects one or more failures (safety phenomena), such as the examples in the following list: (a) signal instability or an increase in EMC disturbance; (b) a single bus line open, or a short to ground or supply (CANH, CANL); (c) a recessive voltage out of range; (d) a bit signal symmetry out of range; (e) a bus termination failure; and (f) shorting between CANH and CANL.

A reconfiguration module 139 of the transmitter of the transceiver and Signal Improvement Capability (SIC) based transmitters may be provided. This function may trigger on events signaled by Monitoring 136 and may use, but not limited to, the following mechanisms to control the CAN Transmitter in accordance to a (mode) table where the control parameters for safety phenomena are stored. A frequency of the dynamic update or reconfiguration cycle may depend on the vehicle system function that is carried out by the connected network nodes. The Reconfiguration module 139 may have capabilities, including but not limited to: (a) activating and controlling a SIC CAN signal improvement function 137 in a dynamic mode, and/or not in a pre-configured (static) mode and (b) controlling the SIC CAN signal improvement function 137 based on a detected short or open or a further failure (e.g., one the failures listed above in connection with the monitoring module 136) on the CAN bus system. The transmitter may be configured such that different impedance schemes are applied on the CANFD or any next generation CAN bus system that may vary from the CAN standard as described in ISO11898:2016.

As shown, a bus termination balance module 140 may be provided as a companion function to the SIC CAN Transmitter, merged or kept separately, and enriches the transmitter capabilities in case of a bus system performance degradation caused by a faulty bus termination of the CAN Network. This functionality may be triggered by the monitoring module 136 or by bus termination balance module 140 itself when observing the CAN, CANFD or any next generation CAN bus performance and the correct termination of line CANH and CANL. For example, the bus termination balance module may detect a change or loss of termination of the bus in a dedicated test mode. If the termination resistance is too low, the bus termination balance module 140 can adjust (increase) the output current drive such that a tolerable output voltage swing is achieved again. If the termination resistance is too high, the bus termination balance module 140 can adjust (decrease) the output current such that the tolerable output voltage swing is achieved again. The monitor and control of the bus termination may be based on a dynamic approach during CANFD network operation; it is not necessarily forced to a firm/static voltage level as it is known from systems that employ CAN Partial Networking techniques.

A safety diagnostic module 138 may store the latest information about the performance of the CAN, CANFD or any next generation CAN bus system (obtained from monitoring module 136), status and mode of CAN Transmitter (e.g. CAN Transmitter 137), and bus termination balancing module 140. The safety diagnostic module 138 makes this information accessible, and/or sends this information on the CAN, CANFD or any next generation CAN bus system and/or to the local host (microcontroller 132). For this communication, a CAN frame may be initiated by the safety diagnostics module 138 to be sent on the CAN bus or communicated to the microcontroller 132 via a dedicated communication channel besides the standard Rx/Tx communication channel. Additionally, the safety diagnostics module 138 may create and update device-relevant data that indicates the proper function of the device during operation.

The transceiver shown also includes communication circuitry for transmitting 134 and receiving 135 data to and from the microcontroller 132.

As disclosed herein, the dual-mode termination circuits may be applied in many applications, including for example Advanced Driver Assistance Systems (ADAS) as well the Antilock Braking System (ABS), and Electronic Power Steering (EPS). In addition, the dual-mode termination circuits may be applied in Domain or Zonal controllers. Further automotive applications are not excluded, neither are non-automotive applications.

By now it should be appreciated that there has been provided a dual-mode bus termination circuit, method and system for use in a Controller Area Network (CAN) bus network. In the disclosed embodiments, the CAN system includes a network bus having first and second bus wires extending between first and second termination ends. In selected embodiments, the network bus is a twisted pair cable. The disclosed CAN system also includes a plurality of CAN transceiver devices connected to the network bus, where each CAN transceiver device is configured to communicate with the network bus by using a differential communication mode, to detect an error on the network bus, and to change to a single-ended communication mode in response to detecting the error on the network bus. In one or more embodiments, the system complies with standards for electromagnetic compatibility (e.g., IEC 62228-3 or another relevant standard) when operating in the differential mode and also when operating in single-ended mode. In addition, the disclosed CAN system includes first and second dual mode bus termination circuits connected between the first and second bus wires of the network bus at, respectively, first and second termination ends of the network bus. In the CAN system, the each of the first and second dual mode bus termination circuits is configured to support both differential and single ended communication modes. In selected embodiments, each of the first and second dual mode bus termination circuits includes first and second resistance termination paths connected in parallel between the first and second bus wires of the network bus, thereby providing an odd mode termination impedance ($R_{ODD}$) that matches an impedance of the network bus when operating in the differential communication mode, and also providing an even mode termination impedance ($R_{EVEN}$) that matches an impedance of the network bus when operating in the single-ended communication mode. In such embodiments, the first resistance termination path may include a first resistor connected between the first and second bus wires of the network bus and having a resistance value of 150Ω. In addition, the second resistance termination path may include a pair of series-connected second resistors connected between the first and second bus wires of the network bus, each having a resistance value of 300Ω, and may also include a splitting capacitor connected between a ground reference voltage and a shared node of the pair of series-connected second resistors. In other embodiments, each dual mode bus termination circuit may include first and second resistors connected in series between the first and second bus wires of the network bus, where each of the first and second resistors has a first resistance value that matches an impedance of the network bus when operating in the differential communication mode; a splitting capacitor connected between a ground reference voltage and a shared node of the first and second resistors; and a third resistor connected between the first and second bus wires of the network bus, where the third resistor has a resistance value, when combined with the first and second resistors, that matches an impedance of the network bus when operating in the single-ended communication mode.

In another form, there is provided a method, system and circuit arrangement for a line termination circuit of a serial bus in which a dual mode bus termination circuit is connected between signal lines of the serial bus and configured to support both differential and single ended communication modes over the serial bus. In the disclosed embodiments, the serial bus may be implemented as a Controller Area Network (CAN) twisted pair of cable wires. In addition, the dual mode bus termination circuit may include first and second resistance termination paths connected in parallel between first and second bus wires of the serial bus to provide an odd mode termination impedance ($R_{ODD}$) that matches an impedance of the serial bus when operating in the differential communication mode, and to also provide an even mode termination impedance ($R_{EVEN}$) that matches an impedance of the serial bus when operating in the single-ended communication mode. In selected embodiments, the first resistance termination path may include a first resistor connected between the first and second bus wires of the serial bus and having a resistance value of 150Ω. In addition, the second resistance termination path may include a pair of series-connected second resistors connected between the first and second bus wires of the serial bus, each having a resistance value of 300Ω; and a splitting capacitor connected between a ground reference voltage and a shared node of the pair of series-connected second resistors. In other embodiments, the dual mode bus termination circuit may include first and second resistors connected in series between the first and second bus wires of the serial bus, where each of the first and second resistors has a first resistance value that matches an impedance of the serial bus when operating in the differential communication mode. In addition, the dual mode bus termination circuit may include a splitting capacitor connected between a ground reference voltage and a shared node of the first and second resistors. In addition, the dual mode bus termination circuit may include a third resistor connected between the first and second bus wires of the serial bus, where the third resistor has a resistance value, when combined with the first and second resistors, that matches an impedance of the serial bus when operating in the single-ended communication mode. In selected embodiments, a CAN transceiver device is connected between signal lines of the serial bus to transmit and receive data on the serial bus in compliance with the International Electrotechnical Commission (IEC) 62228-3 specification when operating in differential communication mode. The disclosed circuit arrangement may also include a plurality of CAN transceiver devices connected to the serial bus, where each CAN transceiver device is configured for communicating with the serial bus by using a differential communication mode when there is no serial bus error condition detected by the CAN transceiver, and by using a single-ended communication mode when the transceiver CAN detects a serial bus error condition. In such embodiments, each CAN transceiver device may be reconfigured to communicate using the single-ended communication mode in response to detecting a serial bus error condition on the serial bus.

In yet another form, there is provided a method, system and circuit arrangement for communicating between an electronic control unit (ECU) and a network bus connected to a dual mode bus termination circuit configured to support both first and second physical layer protocols over the network bus. In the disclosed method, a CAN transceiver device at the ECU is configured to transmit or receive data on the network bus using either the first physical layer protocol or the second physical layer protocol. In addition, the transceiver device at the ECU may be configured to detect an error condition on the network bus, and the transceiver device may be reconfigured to transmit and receive data on the network bus using the second physical layer protocol in response to detecting the error condition. In selected embodiments, the first physical layer protocol may be used to transmit or receive data over a Controller Area Network (CAN) bus using a differential communication mode, and the second physical layer protocol may be used to transmit or receive data over a Controller Area Network (CAN) bus using a single-ended communication mode. To support data transmit or receive operations for both the first and second physical layer protocols, the dual mode bus termination circuit includes first and second resistance termination paths connected in parallel between first and second wires of the network bus to provide an odd mode termination impedance ($R_{ODD}$) that matches an impedance of the network bus when operating with the first physical layer protocol, and to also provide an even mode termination impedance ($R_{EVEN}$) that matches an impedance of the network bus when operating with the second physical layer protocol. In selected embodiments, the first resistance termination path may include a first resistor connected between the first and second wires of the network bus and having a resistance value of 150Ω. In addition, the second resistance termination path may include a pair of series-connected second resistors connected between the first and second wires of the network bus, each having a resistance value of 300Ω; and a splitting capacitor connected between a ground reference voltage and a shared node of the pair of series-connected second resistors. In the disclosed method, the dual mode bus termination circuit enables the transceiver device to transmit and receive data on the network without violating electromagnetic compatibility requirements specified in the International Electrotechnical Commission (IEC) 62228-3 test specification when operating in differential communication mode.

Techniques described herein can be applied to any type of In-Vehicle Networks (IVNs), including a CAN, a LIN, an Ethernet network, a FlexRay® compatible network, and other types of IVNs. Although a CAN device is described in some embodiments, it should be noted that the disclosure is not restricted to CAN devices. For example, the above-described techniques can be applicable to CAN, CAN-FD, and CAN-XL compliant networks. The above-described techniques can also be implemented in a CAN device, such as a CAN transceiver IC device, a microcontroller IC device, or an IC device that includes both a CAN transceiver and a microcontroller.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the disclosure may be implemented entirely in hardware or in an implementation containing both hardware and software elements. In embodiments which use software, the software may include but is not limited to firmware, resident software, microcode, etc.

Although embodiments as described herein may focus on modifications to the CAN communication protocol and methods for using same, the invention is not necessarily limited to the example embodiments illustrated herein and may be applied to any multi-mode system that a two-wire network bus which can operate in both one-wire and two-wire modes. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A Controller Area Network (CAN) system, comprising:
    a network bus comprising first and second bus wires extending between first and second termination ends;
    a plurality of CAN transceiver devices connected to the network bus;
    a first dual mode bus termination circuit connected between the first and second bus wires of the network bus at the first termination end; and
    a second dual mode bus termination circuit connected between the first and second bus wires of the network bus at the second termination end,
    wherein the network bus and first and second dual mode bus termination circuits are jointly configured to support both differential and single ended communication modes.

2. The CAN system of claim 1, where network bus comprises a twisted pair cable.

3. The CAN system of claim 1, where the first and second dual mode bus termination circuits each comprise first and second resistance termination paths connected in parallel between the first and second bus wires of the network bus to provide an odd mode termination impedance ($R_{ODD}$) that matches an impedance of the network bus when operating in the differential communication mode, and to also provide an even mode termination impedance ($R_{EVEN}$) that matches an impedance of the network bus when operating in the single-ended communication mode.

4. The CAN system of claim 3, where the first resistance termination path comprises a first resistor connected between the first and second bus wires of the network bus and having a resistance value of 150Ω.

5. The CAN system of claim 4, where the second resistance termination path comprises:
    a pair of series-connected second resistors connected between the first and second bus wires of the network bus, each having a resistance value of 300Ω; and
    a splitting capacitor connected between a ground reference voltage and a shared node of the pair of series-connected second resistors.

6. The CAN system of claim 1, where the first and second dual mode bus termination circuits each comprise:
    first and second resistors connected in series between the first and second bus wires of the network bus, where each of the first and second resistors has a first resistance value that matches an impedance of the network bus when operating in the differential communication mode;
    a splitting capacitor connected between a reference voltage terminal and a shared node of the first and second resistors; and
    a third resistor connected between the first and second bus wires of the network bus, wherein the first, second, and third resistors are jointly configured such that the third resistor has a resistance value, when combined with the first and second resistors, that matches an impedance of the network bus when operating in the single-ended communication mode.

7. The CAN system of claim 1, where each CAN transceiver device is configured to communicate with the network bus by using the differential communication mode, to detect an error on the network bus, and to change to the single-ended communication mode in response to detecting the error on the network bus.

8. A circuit arrangement for a line termination of a Controller Area Network (CAN) serial bus having a twisted pair of cable wires, the circuit arrangement comprising:
  a dual mode bus termination circuit which is connected between signal lines of the serial bus and configured to support both differential and single ended communication modes over the serial bus;
  wherein the dual mode bus termination circuit comprises first and second resistance termination paths connected in parallel between first and second bus wires of the serial bus to provide an odd mode termination impedance ($R_{ODD}$) that matches an impedance of the serial bus when operating in the differential communication mode, and to also provide an even mode termination impedance ($R_{EVEN}$) that matches an impedance of the serial bus when operating in the single-ended communication mode.

9. The circuit arrangement of claim 8, where the first resistance termination path comprises a first resistor connected between the first and second bus wires of the serial bus and having a resistance value of 150Ω.

10. The circuit arrangement of claim 9, where the second resistance termination path comprises:
  a pair of series-connected second resistors connected between the first and second bus wires of the serial bus, each having a resistance value of 300Ω; and
  a splitting capacitor connected between a reference voltage terminal and a shared node of the pair of series-connected second resistors.

11. The circuit arrangement of claim 8, where the dual mode bus termination circuit comprises:
  first and second resistors connected in series between the first and second bus wires of the serial bus, where each of the first and second resistors has a first resistance value that matches an impedance of the serial bus when operating in the differential communication mode;
  a splitting capacitor connected between a ground reference voltage and a shared node of the first and second resistors; and
  a third resistor connected between the first and second bus wires of the serial bus, where the third resistor has a resistance value, when combined with the first and second resistors, that matches an impedance of the serial bus when operating in the single-ended communication mode.

12. The circuit arrangement of claim 8, further comprising a plurality of CAN transceiver devices connected to the serial bus, each CAN transceiver device configured for communicating with the serial bus by using a differential communication mode when there is no serial bus error condition detected by the CAN transceiver, and by using a single-ended communication mode when there is a serial bus error condition detected by the CAN transceiver.

13. The circuit arrangement of claim 12, where each CAN transceiver device is configured to detect a serial bus error condition on the serial bus and to communicate using the single-ended communication mode in response to detecting the serial bus error condition.

14. A method for communicating between an electronic control unit (ECU) and a network bus connected to a dual mode bus termination circuit configured to support both first and second physical layer protocols over the network bus, comprising:
  transmitting or receiving, by a transceiver device at the ECU, data on the network bus using either the first or second physical layer protocol; where the dual mode bus termination circuit comprises first and second resistance termination paths connected in parallel between first and second wires of the network bus to provide an odd mode termination impedance ($R_{ODD}$) that matches an impedance of the network bus when operating with the first physical layer protocol used to transmit or receive data over a Controller Area Network (CAN) bus using a differential communication mode, and to also provide an even mode termination impedance ($R_{EVEN}$) that matches an impedance of the network bus when operating with the second physical layer protocol used to transmit or receive data over the Controller Area Network (CAN) bus using a single-ended communication mode.

15. The method of claim 14, where the first resistance termination path comprises a first resistor connected between the first and second wires of the network bus and having a resistance value of 150Ω, and where the second resistance termination path comprises:
  a pair of series-connected second resistors connected between the first and second wires of the network bus, each having a resistance value of 300Ω; and
  a splitting capacitor connected between a ground reference voltage and a shared node of the pair of series-connected second resistors.

16. The method of claim 14, further comprising:
  detecting, by the transceiver device at the ECU, an error condition on the network bus; and
  reconfiguring the transceiver device to transmit and receive data on the network bus using the second physical layer protocol in response to detecting the error condition.

* * * * *